(12) United States Patent
Telle

(10) Patent No.: US 10,158,551 B2
(45) Date of Patent: Dec. 18, 2018

(54) SYSTEMS AND/OR METHODS FOR AUTOMATED TESTING AND MONITORING OF BACKEND SERVICES

(71) Applicant: Software AG, Darmstadt (DE)

(72) Inventor: Benjamin Telle, Leipzig (DE)

(73) Assignee: SOFTWARE AG, Darmstadt (DE)

( * ) Notice: Subject to any disclaimer, the term of this patent is extended or adjusted under 35 U.S.C. 154(b) by 371 days.

(21) Appl. No.: 14/971,259

(22) Filed: Dec. 16, 2015

(65) Prior Publication Data
US 2017/0180238 A1 Jun. 22, 2017

(51) Int. Cl.
*G06Q 10/10* (2012.01)
*H04L 12/26* (2006.01)
*H04L 29/06* (2006.01)

(52) U.S. Cl.
CPC ............. *H04L 43/50* (2013.01); *H04L 67/42* (2013.01)

(58) Field of Classification Search
USPC ......................................................... 709/217
See application file for complete search history.

(56) References Cited

U.S. PATENT DOCUMENTS

| | | | |
|---|---|---|---|
| 7,319,661 B1 * | 1/2008 | Bohossian | H04W 76/028 370/216 |
| 8,392,890 B2 | 3/2013 | Miller | |
| 8,489,714 B2 | 7/2013 | Thangadurai et al. | |
| 2007/0300240 A1 * | 12/2007 | Viegener | H04L 67/02 719/320 |
| 2009/0100345 A1 * | 4/2009 | Miller | G06F 11/3688 715/738 |
| 2011/0145402 A1 * | 6/2011 | Thangadurai | G06F 11/3414 709/224 |
| 2013/0226970 A1 * | 8/2013 | Weber | G06F 21/604 707/785 |

OTHER PUBLICATIONS

Wikipedia—Ajax (programming), retrieved Dec. 16, 2015, 7 pages. http://en.wikipedia.org/wiki/AJAX.
Wikipedia—Regular Expression, retrieved Dec. 16, 2015, 18 pages. https://en.wikipedia.org/Wiki/Regular_expression.
Wikipedia—Event (computing), retrieved Dec. 16, 2015, 5 pages. https://en.wikipedia.org/Wiki/Event_(computing).

* cited by examiner

*Primary Examiner* — Vivek Srivastava
*Assistant Examiner* — Hien V Doan
(74) *Attorney, Agent, or Firm* — Nixon & Vanderhye, P.C.

(57) ABSTRACT

Certain example embodiments relate to a Resume Trigger Manager (RTM) and associated computing framework that handles client-server communications associated with automated application testing and/or monitoring, for both a system under test and third-party servers. The RTM in certain example embodiments performs the test execution by routing service request messages from one or more clients to the web server in accordance; maintains a count of open service requests for each client; and relays return messages from the web server to the client(s). When a wait request is received from a given client, the RTM may determine that there are no open service requests for that client and send a wait response message indicating same; and/or that a period of time has elapsed and accordingly interrupt pending service requests for that client, reset that client's counter, and return a wait response message indicating that the predefined period of time has elapsed.

24 Claims, 6 Drawing Sheets

SYSTEMS AND/OR METHODS FOR AUTOMATED TESTING AND MONITORING OF BACKEND SERVICES

TECHNICAL FIELD

Certain example embodiments described herein relate to techniques for automated testing and monitoring of backend services, e.g., in a web-based environment. More particularly, certain example embodiments described herein relate to a Resume Trigger Manager and associated computing framework that intercept or otherwise handle client-server communications associated with automated application testing and/or monitoring, both for a system under test as well as for third-party server connections more directly.

BACKGROUND AND SUMMARY

There currently are many commercially available tools and test frameworks for testing web applications within a software development process. One of the most challenging tasks during test automation using these frameworks is the synchronization between a test sequence and the system under test (SUT). It typically is desirable to ensure that automated tests run well under various conditions that impact the runtime and overall performance of the system under test. Parameters affecting these conditions include, for example, hardware resources of the SUT, hardware resources of the client (e.g., the browser system), network traffic, parallel usage of the hosts involved, type and version of the browser used for automation (e.g., Internet Explorer, Firefox, etc.), and/or the like.

Because a test automation framework should retrieve reliable results under conditions affected by these and/or other parameters, it is desirable to ensure that the test execution can handle different scenarios regarding available resources of the SUT. For instance, a test framework may in some test scenarios need to be sure to check an expected result at a time that is neither before a server has delivered a response, nor before a client has finished processing and rendering the associated content.

When testing simple web applications without AJAX (Asynchronous JavaScript and XML), for example, the automation software can wait for a specific event of the browser. This event is raised by the browser when the response has been delivered by the server and the browser has finished rendering. At this time, the test can resume checking results for expected values. An event in this instance refers generally to a software-originated or other message that indicates that something has happened such as, for example, a keystroke, a mouse click, a webpage that has finished loading, etc.

Yet if the web application uses AJAX, this mechanism is not applicable. It therefore can be very difficult to determine the correct and reliable point in time for resuming test execution.

One advantage of AJAX applications over simple web applications relates to the ability to reload and render just a portion of a page for user interactions, as opposed to needing to reload and render an entire page. The communication between browser and server is done asynchronously. The browser will not raise a "ready" event to signal rendering has been finished. One benefit of this approach relates to potentially massively decreased network traffic using AJAX for web applications.

The use of AJAX can becomes an issue, as it currently requires a static time for waiting for user interactions to complete. Because there is no event to listen to, the time to wait has to be long enough to ensure actions have been finished and that the SUT is ready to resume. Thus, running functional tests in a huge and complex test suite for example can involve the test automation waiting at many (sometimes thousands, tens of thousands, or even more) points of execution. These waiting times add up, thereby increasing the time of execution of large test suites. But in software development processes using continuous integration and nightly builds, for example, the test execution time easily can draw near 24 hours. This can lead to conflicts running the test automation for every nightly build.

FIG. 1 is a sequence illustrating this timing issue. As can be seen in FIG. 1, the critical time slot #1 spans a timeframe between user interaction (passed from the framework to the browser) and the appearance of the progress indicator (based on information transmitted from the browser to the framework). It will be appreciated that if there is no progress indicator displayed, the critical time slots #1 and #2 will be merged into one longer critical time slot between the user interaction and the appearance of the new rendered object.

In this example, the critical time slot #1 can take from a few milliseconds up to several seconds. The amount of time may depend on parameters such as, for example, the browser version, the client operating system, the hardware resources, the load of the machine, etc. Furthermore, as will be appreciated, there can be a high fluctuation of performance during test execution of a whole test suite.

Critical time slot #2 spans a timeframe between disappearance of the loading image and the displaying of the new rendered AJAX object. This time slot also can differ in its dimension, e.g., based on the above-described and/or other parameters.

During these time slots, the automation framework cannot determine whether the processing of the user interaction has already been finished, or has not yet started. That said, critical time slot #2 can be handled by waiting for a specific GUI object or state change of an object. This feature is supported by most frameworks, e.g., through the observance of the expected object being rendered by the browser However, critical time slot #1 cannot be handled in this way, as it is hard to determine whether the observed object has already been refreshed, or whether it is still being displayed prior to being reloaded. Thus, the automation framework here typically has to use a fixed wait time to help make sure that this time slot is fully covered. For instance, a fixed wait time can be introduced after each user interaction (e.g., mouse click, keystroke, etc.).

It would be desirable to make this fixed wait time long enough to cover situations where there is a high load on the test server. Generally, this amounts to at least 5 to 10 seconds. These wait times in the aggregate have the potential to massively increase test execution time of the whole test suite.

Shortening the wait time would accelerate tests and decrease the time to finish. While this might be faster, it could lead to instability because the synchronization between the browser and the test framework is not reliable. Conversely, choosing longer waiting times reduces instability but extends the time to finish all tests.

Consider, for example, a test suite providing 500 test cases, with about 10 requests to the server per test case (inclusive of pre- and post-conditions) and 7 seconds of wait time after every user interaction for synchronization. This adds up to nearly 10 hours just for the loading and wait time for 5,000 requests. For the majority of these requests, there is no need for such a long waiting time but, unfortunately, it is unpredictable when a longer wait time is required.

As an alternative to adopting fixed wait times, the SUT could be altered, e.g., to send out status information to the test framework. Similarly, it is possible to change the document object model (DOM) at runtime and/or add JavaScript or the like that is executed, e.g., to signal to the test framework to continue with test execution. Still other solutions may deal with the same problem, but do so by making code changes with respect to the SUT (direct or indirect) or indirectly requesting monitoring in parallel to the browse-to-server communication.

Unfortunately, however, these approaches require changes to the code of the SUT (directly or indirectly) during runtime and/or development time. As a result, the software under test will not be the same as the software delivered to customer. These tests therefore do not prove that the same software will run properly in a production environment, for a customer, etc. The further modification of code to include adapters also typically involves a proprietary interface with the request monitoring and test tool.

A further problem during test automation relates to the maintenance of test data. For instance, in scenarios where the web server needs to fetch data from third-party services to process requests from browsers, the maintenance of test data can become a very time consuming issue, e.g., if the data is changed very often, depends on a request time, etc. There are many example services that fall into this category including, for example, services that retrieve current interest rates, hardware sensor data, and/or the like. To handle these situations, the test data (reference values to be compared with displayed information in browser) may be adapted frequently, or the service may be mocked to deliver identical values every time. But these techniques result in the application being tested in manner that does not correspond to a real-world scenario with varying data.

In this regard, when it comes to mocking services to obtain fix data, the service to be called during the test run will be simulated. A service with the same signature as the real service is implemented, and the mock-implementation of the service delivers static data to test against. The delivered data can also be mocked depending upon incoming requests.

Yet if this mocking approach is used, every service that is used to obtain data for displaying in a browser may have to be mocked. Many implementation may have to be written, delivering all different constellations of data with extreme values for the upper and lower bounds, special cases, and so on. But even if all of this work is undertaken, this still may not cover every situation that can be delivered by a real service bound to the system (especially in the case of, for example, services delivering sensor data, real-time rates, etc.).

If the data received by the third-party service is rarely changed, it is possible to adapt the expected results in the test case specification every time the service delivers other data than expected. However, even services that deliver more or less fixed data will sometimes change the values with which they respond. Depending on the frequency, it can be very time consuming to adapt the test data (expected results) stored in the test framework on the test framework side.

Regular expressions (e.g., sequences of characters that define a search pattern) also may be used for validating information displayed in the browser. If the service delivers well-structured, but frequently changed, data, the test framework can use regular expressions or the like to compare information displayed in a GUI with expected results. This way, no real value is checked, but the structure of the data is. But depending on the ability to identify proper regular expressions, there is a potential variable gap in the test coverage. Moreover, real values are not verified. Also, if the structure of the delivered data is changed, the regular expression may need to be adapted in the test framework.

For example, assume that there is a user interaction in a browser that forces the web application to retrieve the current values of temperature sensors and display the results on a webpage. The displayed parameter could have different values (positive, negative), or different measurement units, such as ° K, ° C. or ° F. To match all the values, the test framework will not check whether the correct value is displayed in the browser (e.g., as "−13.7° C."). However, the structure of the value can be checked using a regular expression such as, for example:

-?\d+[,\.]\d+° [FKC]

If the processing of the sensor value in the web server does not work correctly, that issue cannot be identified by the test, as the regular expression only checks whether the displayed temperature has the correct structure, rather than whether the value displayed on the webpage is the exact same value delivered by the sensor.

Indeed, if the value delivered by sensor service is 78.9° F., but the value processed by the web server is 68.9° F. (and is incorrect because of a defect in the SUT), no error will be generated. That is, 68.0° F. is displayed in the browser but the test automation framework will only check this value using the regular expression, leading the test automation framework to not report an error because there is a valid temperature with a valid structure displayed.

Certain example embodiments address the above and/or other concerns. For instance, certain example embodiments relate to improved techniques for testing and monitoring, e.g., when running automated tests in an AJAX and/or other asynchronous messaging frameworks. Although AJAX and other like frameworks are beneficial in many real-life scenarios (e.g., when an end-user is sitting in front of a browser) where the communication between the web browser and the web server is performed asynchronously, such asynchronous behaviors oftentimes cause problems for automated testing and/or monitoring. Certain example embodiments advantageously help overcome these issues by providing a Resume Trigger Manager and/or associated techniques. The architecture of certain example embodiments has a very low footprint, as the web browser and the test framework are adapted only slightly. In the more general case of monitoring backend servers (which may be third-party servers), the problem of client identification is solved pragmatically.

One aspect of certain example embodiments relates to a Resume Trigger Manager interposed between a browser and a backend web server. An intelligent approach to handling asynchronous messaging advantageously may help to reduce wait times typically involved in accurate test frameworks.

Another aspect of certain example embodiments relates to intercepting or otherwise handling client-server communications, allowing a test framework to have a more accurate figure for the timing of the server call.

Another aspect of certain example embodiments relates to accumulating wait requests at an intermediary system interposed between the browser and one or more web servers (regardless of whether such web servers are third-party web servers) until a certain event is triggered, thereby enabling the bypassing of other servers in the middle and facilitating direct client to third-party server connections. Relying more directly on the functionality of certain third-party servers advantageously allows for monitoring of other intermediate servers and is a potentially low footprint and easy to implement approach to testing and monitoring tools.

Certain example embodiments relate to a test manager system for facilitating testing of a web server and/or a network-provided computer service running on the web server in accordance with a test execution that includes a plurality of test operations. Processing resources include at least one processor and a memory operably coupled thereto. The processing resources are configured to control the test manager system to at least perform the test execution by at least routing service request messages from one or more client computer systems to the web server in accordance with the test execution; maintaining, for each client computer system, a count of open service requests not yet responded to by the web server; relaying return messages from the web server to the one or more client computer systems in accordance with the routed service request messages; and receiving a first wait request from a given client computer system. In response to reception of a first wait request from a given client computer system: a determination is made as to whether there are any open service requests for the given client computer system based at least in part on the count associated with the given client computer system, and a determination is made as to whether a predefined period of time has elapsed; in response to a determination that there are no open service requests for the given client computer system, a first wait response message indicating that there are no open service requests for the given client computer system is returned to the given client computer system; and in response to a determination that the predefined period of time has elapsed, (a) each pending service request for the given client computer system is interrupted, (b) the counter for the given client computer system is reset, and (c) a first wait response message indicating that the predefined period of time has elapsed is returned to the given client computer system.

In certain example embodiments, there is provided a method of testing a web server and/or a network-provided computer service running on the web server in accordance with a test execution that includes a plurality of test operations. The method comprises, at an intermediary computing device including processing resources including at least one processor and a memory: routing service request messages from one or more client computer systems to the web server in accordance with the test execution; maintaining, for each client computer system, a count of open service requests not yet responded to by the web server; relaying return messages from the web server to the one or more client computer systems in accordance with the routed service request messages; and receiving a first wait request from a given client computer system. The method further comprises, in response to reception of the first wait request from the given client computer system: determining whether there are any open service requests for the given client computer system based at least in part on the count associated with the given client computer system, and determining whether a predefined period of time has elapsed; in response to a determination that there are no open service requests for the given client computer system, returning to the given client computer system a first wait response message indicating that there are no open service requests for the given client computer system; and in response to a determination that the predefined period of time has elapsed, (a) interrupting each pending service request for the given client computer system, (b) resetting the counter for the given client computer system, and (c) returning to the given client computer system a first wait response message indicating that the predefined period of time has elapsed.

According to certain example embodiments, at least one test operation in the test execution may involve a call to a third-party web service hosted by a third-party web server and, for the at least one test operation in the test execution that involves the call to the third-party web service, the processing resources of the test manager system may be configured to control the test manager system to at least: receive a second wait request from the client computer system responsible for initiating the respective call to the third-party web service; route, to the third-party web server, a corresponding service request message from the client computer system responsible for initiating the respective call to the third-party web service; relay a response to the routed corresponding service request message to the client computer system responsible for initiating the respective call to the third-party web service; determine whether the corresponding service request message has been handled; and in response to a determination that the corresponding service request message has been handled, return to the client computer system responsible for initiating the respective call to the third-party web service a second wait response message indicating that the corresponding service request message has been handled and including information associated with the response to the routed corresponding service request message relayed to the client computer system responsible for initiating the respective call to the third-party web service. The second wait request may be received by the test manager system before the corresponding service request message is received by the test manager system. The web server may be a web server under direct test; the corresponding service request message from the client computer system responsible for initiating the respective call to the third-party web service may be routed to the third-party web server via the web server under direct test; and the response to the routed corresponding service request message may be relayed to the client computer system responsible for initiating the respective call to the third-party web service via the web server under direct test.

In certain example embodiments, the test execution may require changes to neither the web server, nor the service running thereon.

Corresponding methods and non-transitory computer readable storage mediums tangibly storing instructions for performing such methods also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 3 is an example sequence diagram demonstrating how certain example embodiments may be used to monitor reference values provided by third-party services and/or the like;

DETAILED DESCRIPTION

Certain example embodiments relate to systems and/or methods for automated testing and monitoring of backend services, e.g., in a web-based environment. In certain example embodiments, a Resume Trigger Manager (RTM) aids in synchronizing communications between a test framework and a web browser or other remote computer system, and/or facilitates the monitoring of reference values of third-party services. Certain example embodiment advantageously enable such techniques to be implemented, with only minor modifications to the test framework and web browser or other remote computer system, thereby promoting reliability of the testing and/or monitoring and ease of implementation.

Figure 1:
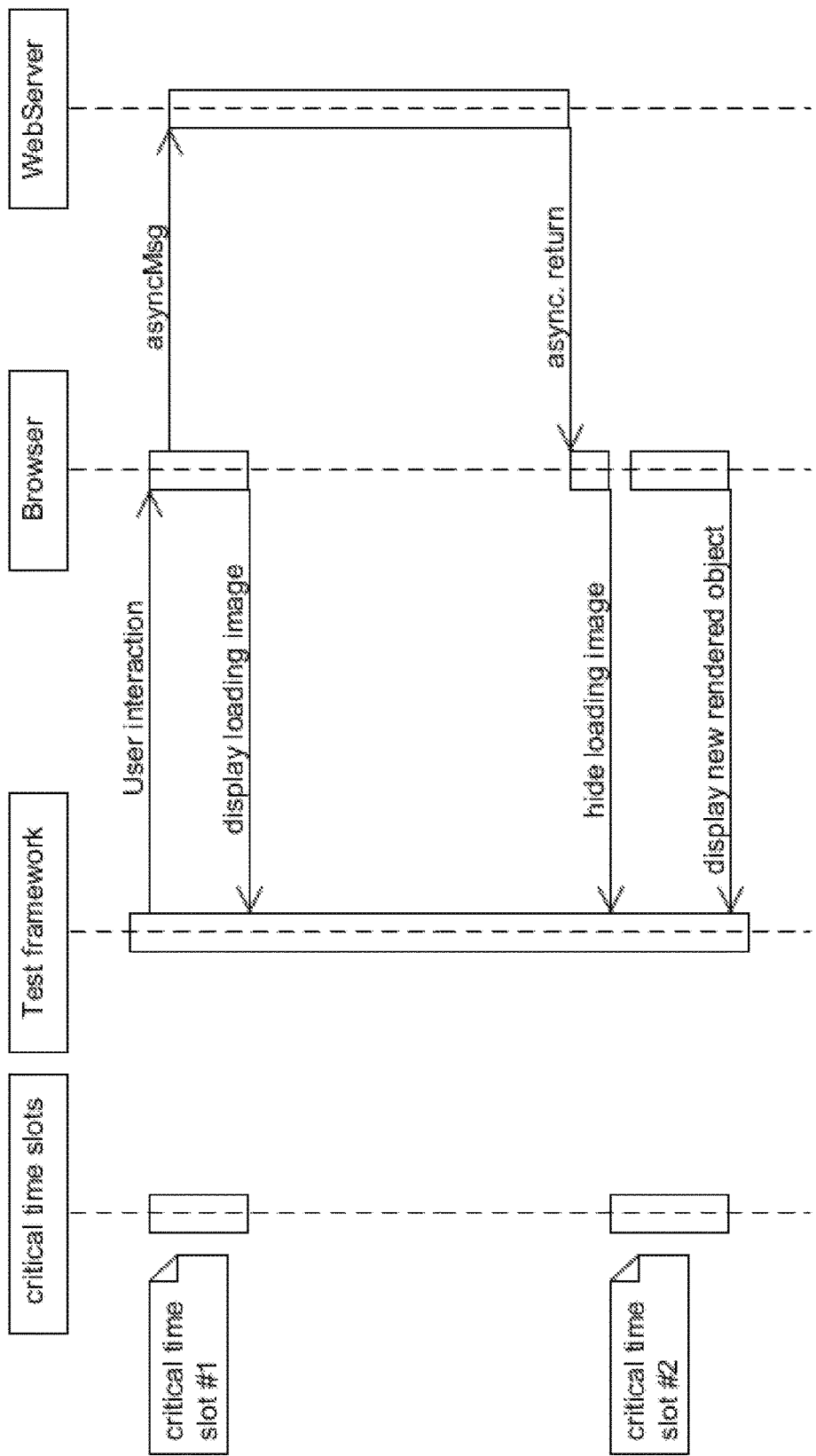
FIG. 1 is an example sequence diagram that helps demonstrate timing issues with some test frameworks.
Figure 2:
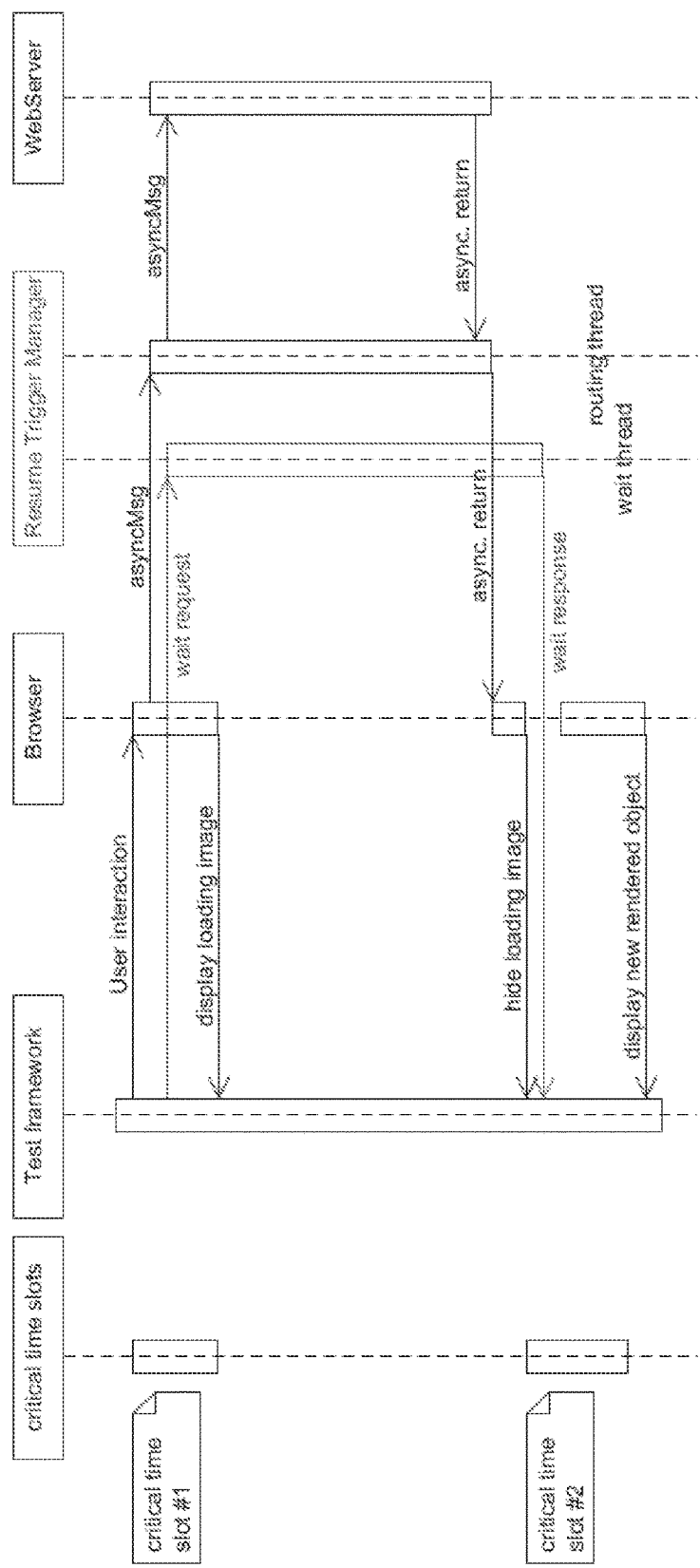
FIG. 2 is an example sequence diagram that helps demonstrate the techniques of certain example embodiments.

Referring now more particularly to the drawings, FIG. 2 is an example sequence diagram that helps demonstrate the techniques of certain example embodiments. As will be appreciated from the drawings, the FIG. 2 sequence diagram is similar to the FIG. 1 sequence diagram. However, in FIG. 2, the RTM is included between the browser and the backend web server. The RTM of certain example embodiments acts as an intermediary for requests from the browser to the web server and handles several tasks. First, the RTM of certain example embodiments aids in relaying and counting open requests. In this regard, the RTM of certain example embodiments routes requests from the browser to the destination server, e.g., as provided in the relevant HTTP header fields or as for provided for by other suitable protocols. To achieve this, the RTM may be configured as a proxy in the browser settings. As a result, the RTM can be used with a wide range of browsers under test. Indeed, all or virtually all modern and commercially significant web browsers can accommodate proxy servers. The RTM counts all open requests for every connected client. This number represents the amount of currently open requests not yet responded to by the web server. Each request increases the counter. The corresponding server response decreases it.

The RTM of certain example embodiments also provides status information. That is, in certain example embodiments, the RTM offers a service (e.g., via HTTP or other suitable protocol) that can be requested by a test automation framework. If requested, the RTM service returns a status result as soon as there are no pending requests left, or a timeout expires (e.g., whichever comes first). In the event that a timeout is detected, all open connections for the client may be interrupted, and the request counter may be reset. As will become clearer from the description provided below, this behavior helps ensure a defined status for the following tests.

At test runtime, the test framework is synchronized with the browser and the web server. The test framework will call the RTM status service as soon as a user interaction is triggered. Sometimes, a single user interaction will cause multiple requests to the web server. However, in certain example embodiments, the RTM status service only returns a result if all requests are processed. In this way, the time span of slot #1 can be covered, exactly. In another step, the test framework can "wait for a component" by observing the browser in a manner able to handle the critical time slot #2. These operations can be grouped to help ensure that the test execution is halted until all server communication has finished and that the new or changed AJAX object is rendered in the browser, for example.

As alluded to above, an advantage made possible by certain example embodiments relates to the ability to use the example techniques set forth herein with basically any web testing framework, without developing adapters, etc., because the RTM can be configured as a proxy in the browser used for automation. Similarly, and also as alluded to above, there advantageously is no need to change the code of the system under test (SUT) or to manipulate any Java scripts running in a browser in certain scenarios. Advantageously, even the communication between the client and server is merely observed, and not manipulated, by the RTM in certain example embodiments. The software under test is exactly the same software running on the customer side. This helps reduce (and potentially even eliminate) the possibility of errors being introduced by virtue of code changes that otherwise might need to be made for test automation purposes.

The RTM can also be used to monitor the communication between two servers. In this way, the test framework can receive reference data that is delivered by third-party services, e.g., to compare it against information displayed by the browser. In cases where a test has to check whether a web application correctly displays data received from a third-party service, the reference data is no longer held as separate test data in the test framework, but instead can directly be retrieved from the RTM, which in certain example embodiments handles the requests between the web server and the third-party service. The wait response includes the information from the third-party service and can be used to compare it against the data displayed in the browser.

Using this approach, this data does not need to be maintained directly in the test framework. Moreover, the third-party service does not need to be mocked in order to keep the test data static. Instead, real services, if applicable and available, can be used. If the requested data changes, the reference values that are used for comparisons with the expected results automatically will be changed, as well.

Figure 3:
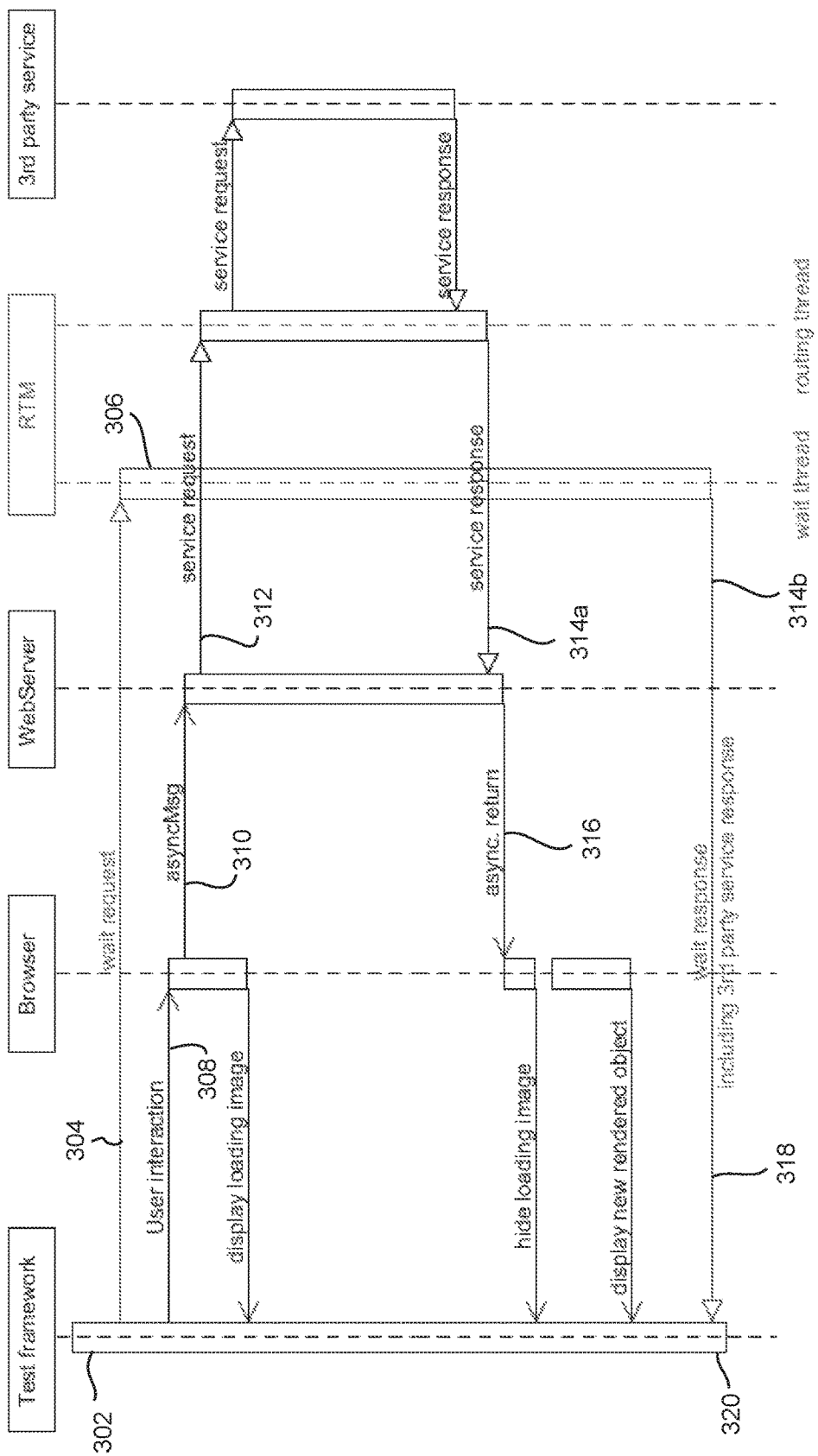

In this regard, FIG. 3 is an example sequence diagram demonstrating how certain example embodiments may be used to monitor reference values provided by third-party services and/or the like. In step 302, the test automation framework (TAF) has to execute a test step to fetch the temperature value and prove the correct visualization on the webpage. Before triggering the user interaction to fetch the new data, in step 304, the TAF sends a wait request to the RTM with information about the service to be monitored. As indicated in step 306, the RTM is now waiting for the service request that was announced by the wait request. This waiting occurs along the wait thread. The TAF executes the user interaction on the webpage in step 308 to receive a new value for the temperature, and the browser sends this request to the web server in step 310.

The web server requests the ordered information from the third-party service using the RTM as a proxy, as indicated in step 312. For the purposes of this example, the third-party service delivers the temperature values from a sensor. The RTM routes back the response to the web server in step 314*a*, and it also sends back a copy of the answer as a response of the wait request to the TAF in step 314b. The copy of the answer includes the data retrieved from the sensor, in this example.

The web server replies to the browser with the response in step 316, and the browser renders a new webpage with the temperature information retrieved from the web server in step 318. The TAF can compare information from the sensor service, which is included in the wait response, with the displayed information in the browser, as indicated in step 320.

Example Implementation

An example implementation for the RTM of certain example embodiments will now be provided. Of course, it will be appreciated that other implementations may be used in different example embodiments.

As will be appreciated from the above, the RTM of certain example embodiments is an intermediary that relays requests from clients to target servers. When the server response is available, it is routed back to the client via the RTM. The RTM itself is configured in a browser as a proxy server. In this way, the RTM of certain example embodiments is basically independent from the browser used for testing, and the test framework.

While this message routing is occurring, the RTM of certain example embodiments in parallel collects data about all open requests on a per-client basis. The information that is collected may be performed using a simple counter for each client. The counter is increased for every request from the client, and decreased for every server response. The counters may be maintained on the RTM, e.g., in a memory and/or non-transitory computer readable storage medium thereof.

The client may be identified either by its IP address only, by recognizable header information in the HTTP request (e.g., as configured by an authorized user), using one or more other suitable unique or non-unique identifiers, and/or a combination thereof. More particularly, if there is only one client per host, the RTM of certain example embodiments may use the IP address for identification of the client. Otherwise, it may be desirable to use a further identification item in place of or together with the IP address. One example of another identifier that may be used together with the IP address is a standard header field, like "User-Agent: webMethods@node35A7BD11". A custom header field added by the client also may be used in certain example embodiments. The RTM may use the IP address (e.g., retrieved from the HTTP connection) by default in order to identify the client. The use of HTTP header fields or other identifying information for identification purposes may be specified by configuring the RTM appropriately.

The RTM in certain example embodiments offers a wait-service (e.g., via HTTP or the like) that can be called from the automation framework to obtain information if there are pending requests. This service in certain example embodiments will respond only if no open request exists for that client, or a certain timeout period has expired. Because these service calls are only requests for metadata, they will not increase the counter for this client.

Because many clients request resources sequentially, there is a probability that the automation framework will request the service of interest between two requests to a web server. In this case, the RTM of certain example embodiments may report a finished state even if some requests from the client/browser are still not handled. To help avoid this situation, the service may be extended in a manner similar to that shown in FIG. 4.

Figure 4:
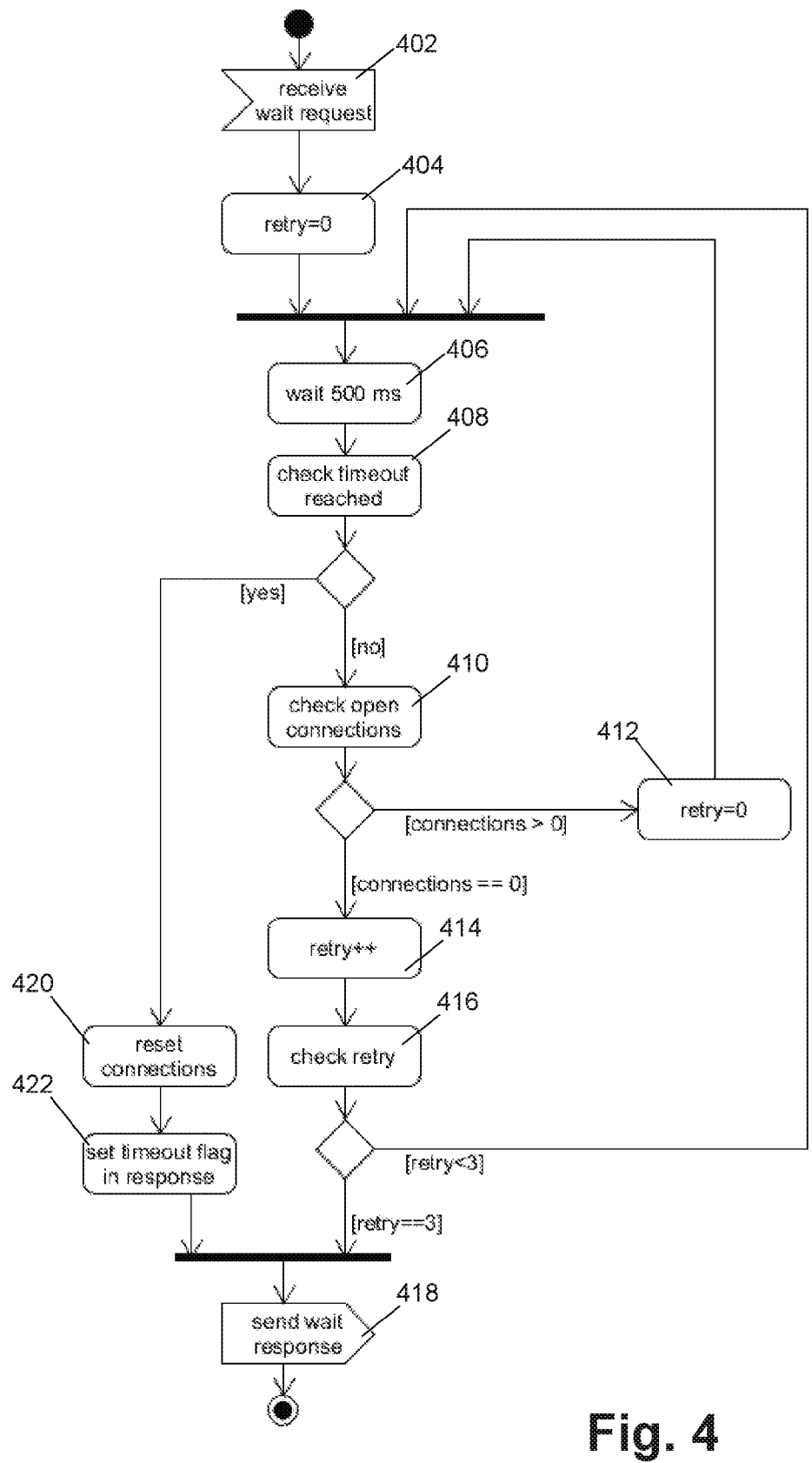
FIG. 4 is a flowchart showing a process for reducing the likelihood of erroneous end states being communicated, in accordance with certain example embodiments.

The requested service starts a loop that checks the number of pending requests from that client (e.g., following the receipt of a wait request in step 402 of FIG. 4 and the setting of a retry counter to 0 in step 404 of FIG. 4). The thread sleeps for a configurable time (e.g., 500 ms by default) at the beginning of every loop, as indicated in step 406 of FIG. 4. This loop will terminate, if there are no more pending requests a predefined number of times in a row (e.g., based on the output of the retry counter, with the number being configurable and being set by default, for example, to 3) and if the configured timeout period (e.g., which may be set to 5 minutes by default). In this case, the response will be sent back to the automation framework, which now can proceed with the next test step.

If the loop has not terminated before the timeout period has expired, all open connections of this client will be dropped, and the counter will be reset to zero. Then, the appropriate response is sent back to the automation framework with a signal that the timeout has expired.

Referring once again to FIG. 4, if the timeout has not been reached as determined in step 408, then the number of open connections is checked in step 410. If there are more connections, then the retry flag is set to zero in step 412 and the loop is repeated (i.e., by returning to step 406). If there are no more connections, then the retry counter is incremented in step 414, and the retry counter is checked against the predefined threshold. If the retry threshold has not been exceeded, then the loop is repeated (i.e., by returning to step 406). On the other hand, if the retry threshold has been exceeded, then the loop is ended, and a wait response message is sent in step 418. If the timeout has been reached as determined in step 408, then the number of connections is reset in step 420, the timeout flag is set for the response in step 422, and a wait response message is sent in step 418.

For monitoring reasons, the RTM of certain example embodiments may be asked to observe special requests. If the test framework wants to gather information about the answer of a third-party service called by the web server, for example, it can extend the wait-request header with special information about the service that should be tracked. In this regard, if this header field is received, the RTM may send a copy of the third-party service response in the wait-response. See, for example, step 318 of FIG. 3, and the related description above.

Figure 5:
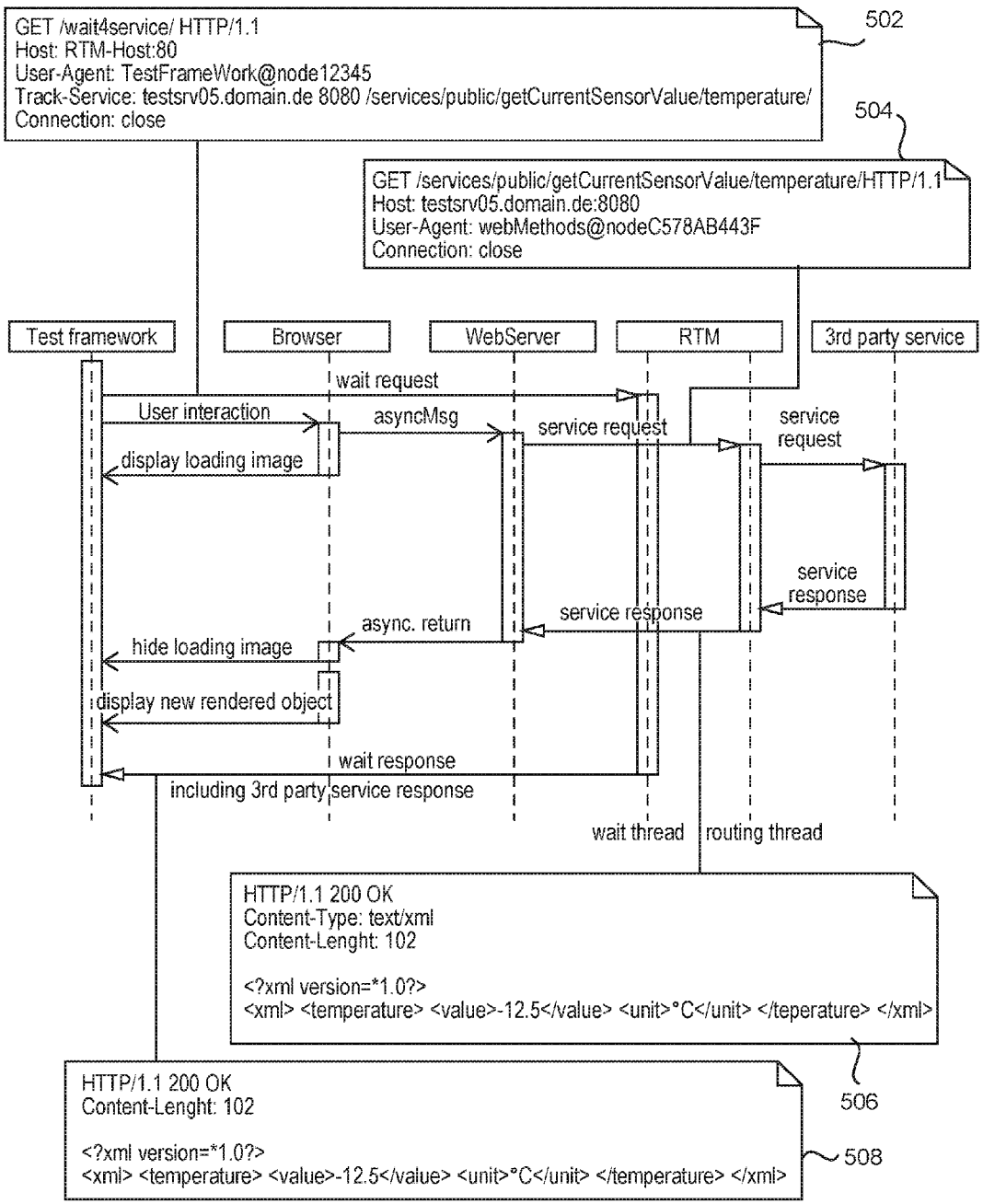
FIG. 5 is an annotated version of the FIG. 3 sequence diagram, showing example content of response messages, when special handling is requested, in accordance with certain example embodiments.

The following is an example of a monitoring request that may be issued by the test framework to the RTM:
GET /wait4service/ HTTP/1.1
Host: <-RTM-host->:<-port->
Track-Service: testsrv05.domain.de 8080
   /services/public/getCurrentSensorValue/temperature/
Connection: keep-alive FIG. 5 is an annotated version of the FIG. 3 sequence diagram, showing example content of response messages, when special handling is requested, in accordance with certain example embodiments. If the RTM receives a request such as that presented above on its wait thread (see request 502 in FIG. 5), it is ordered to wait for a service call on the routing thread to host "testsrv05.domain.de" on port "8080" with the URI "/services/public/getCurrentSensorValue/temperature/", and route this service call as requested by the calling server (see service request 504 in FIG. 5). It waits for a response from the service "/services/public/getCurrentSensorValue/temperature/", and routes the answer back to the requesting server (see service response 506 in FIG. 5).

The wait response is sent to the test framework with a copy of the response of the service "/services/public/getCurrentSensorValue/temperature/" within its HTTP body (see wait response 508 in FIG. 5).

This information can be used as a reference value to compare against the data displayed by the browser. When there are differences and the response of the wait-request is logged in a test protocol, a quality assurance engineer or other person responsible for testing and/or monitoring may follow-up to determine whether there is a problem in the processing of the data delivered by the service, a problem in the service response itself, etc.

Maintenance of expected data is not required, which can be particularly advantageous in an integration test scenarios.

Figure 6:
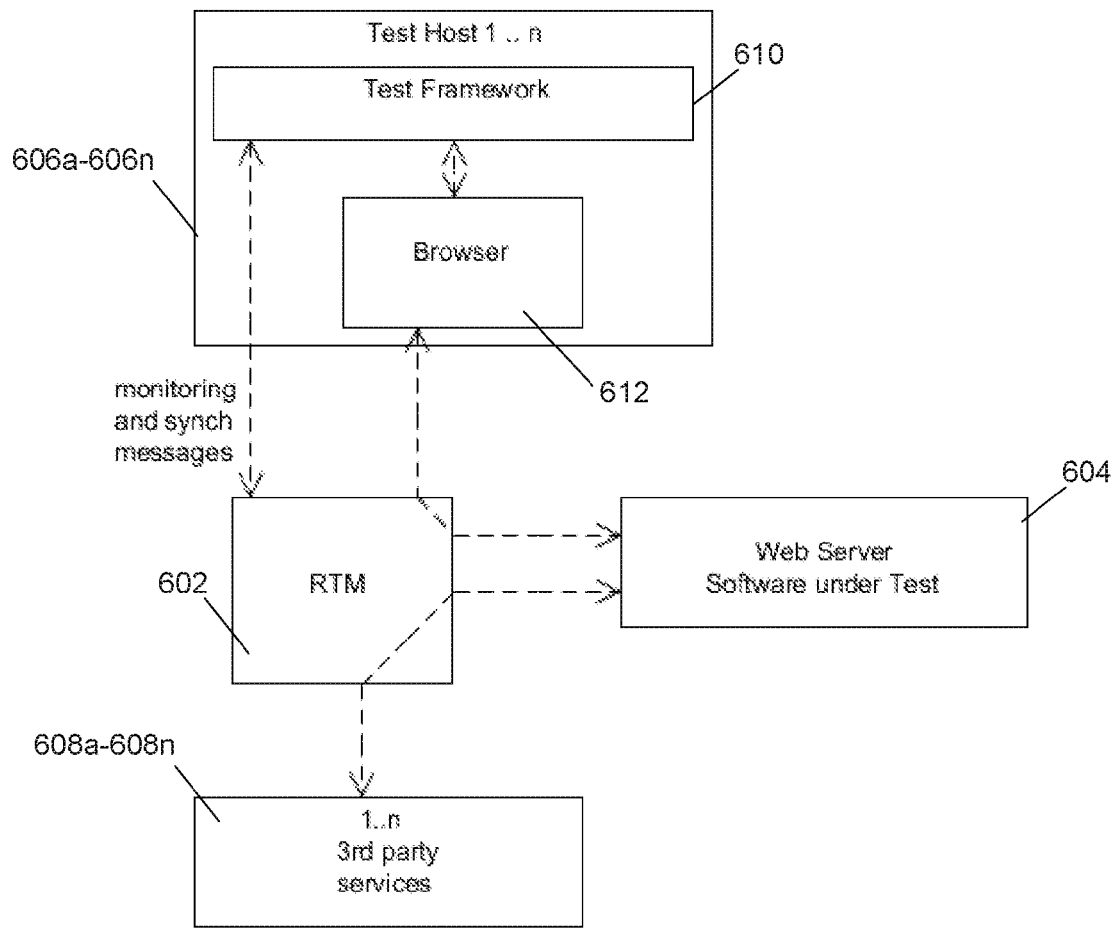
FIG. 6 is a block diagram showing components of a test orchestration in accordance with certain example embodiments.

FIG. 6 is a block diagram showing components of a test orchestration in accordance with certain example embodiments. As shown in FIG. 6, the RTM 602 is interposed between the web server 604, which includes software under test, and one or more test hosts 606a-606n. Also as shown in FIG. 6, the RTM 602 is interposed between the web server 604 and one or more third-party service providers 608a-608n.

The RTM 602 may be hosted by a computer system, comprising processing resources including at least one processor and a memory operably coupled thereto. The RTM 602 is configured to execute wait threads and routing threads, e.g., as shown in and described in connection with FIGS. 2-3 and 5. In this regard, the RTM 602 may include a first network interface to the web server 604, a second network interface (or a set of second network interfaces) to the one or more test hosts 606a-606n, and a third network interface (or a set of third network interfaces) to the one or more third-party service provider systems 608a-608n. The RTM 602 may include a computer readable medium that maintains counters, request information, etc.

The one or more test hosts 606a-606n may be provided on computer systems remote from the RTM 602 in certain example embodiments, or one or more of these one or more test hosts 606a-606n may be provided on a common computer system. Regardless, the computer system hosting the one or more test hosts 606a-606n may include processing resources comprising at least one processor and a memory, as well as a test framework 610. The test framework 610 may include a set of instructions designed to test and/or monitor performance of the web server 604 and/or the software thereon. For instance, the instructions may send monitoring and synchronization messages that are intercepted or otherwise handled by the RTM 602, e.g., in accordance with the above, in order to test how the software on the web server 604 and/or third-party services provided by the one or more third-party service provider systems 608a-608n perform in connection with a browser 612 hosted by the one or more test hosts 606a-606n or a remote system. As indicated above, the browser 612 may be configured to reference the RTM 602 as a proxy.

The web server 604 includes the software under test, which may be stored to a non-transitory computer readable storage medium thereof, and executed under control of processing resources (e.g., at least one processor and a memory) of the web server 604. It normally may interact with third-party services provided by the one or more third-party service provider systems 608a-608n, directly or indirectly. In the test scenario, it may interact with the one or more third-party service provider systems 608a-608n via the RTM 602. The one or more third-party service provider systems 608a-608n may include processing resources, as well, e.g., for executing software that returns relevant service-related information.

Suitable network interfaces and/or connections may be provided to the web server 604, the one or more test hosts 606a-606n, and/or the one or more third-party service provider systems 608a-608n, e.g., to enable them to communicate with one another, directly or indirectly, via the RTM 602.

Although certain example embodiments have been described as relating to AJAX-related implementations, it will be appreciated that the example techniques set forth herein may be used in connection with a variety of different frameworks, regardless of whether they involve JavaScript and/or XML. For instance, certain example embodiments may be used in connection with other frameworks that involve asynchronous communications between a web browser or other front-end application and a web server or other backend computer system. Thus, the example techniques set forth herein also are not limited to web browsers and/or web servers/web services. Furthermore, although certain example embodiments are discussed in relation to user interface related interactions, the example techniques described herein may have use in other contexts, which may or may not involve user interactive or other information display related applications.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A test manager system for facilitating testing of a web server and/or a network-provided computer service running on the web server in accordance with a test execution that includes a plurality of test operations, the system comprising:

processing resources including at least one processor and a memory operably coupled thereto, wherein the processing resources are configured to control the test manager system to perform the test execution by:
routing service request messages from one or more client computer systems to the web server in accordance with the test execution;
maintaining, for each client computer system, a count of open service requests not yet responded to by the web server;

relaying return messages from the web server to the one or more client computer systems in accordance with the routed service request messages;

receiving a first wait request from a given client computer system; and in response to reception of a first wait request from a given client computer system:

determining whether there are any open service requests for the given client computer system based at least in part on the count associated with the given client computer system, and determining whether a predefined period of time has elapsed;

in response to a determination that there are no open service requests for the given client computer system, returning to the given client computer system a first wait response message indicating that there are no open service requests for the given client computer system; and in response to a determination that the predefined period of time has elapsed, (a) interrupting each pending service request for the given client computer system, (b) resetting the counter for the given client computer system, and (c) returning to the given client computer system a first wait response message indicating that the predefined period of time has elapsed.

2. The system of claim 1, wherein at least one test operation in the test execution involves a call to a third-party web service hosted by a third-party web server and, for the at least one test operation in the test execution that involves the call to the third-party web service, the processing resources of the test manager system are configured to control the test manager system to at least:

receive a second wait request from the client computer system responsible for initiating the respective call to the third-party web service;

route, to the third-party web server, a corresponding service request message from the client computer system responsible for initiating the respective call to the third-party web service;

relay a response to the routed corresponding service request message to the client computer system responsible for initiating the respective call to the third-party web service; determine whether the corresponding service request message has been handled; and in response to a determination that the corresponding service request message has been handled, return to the client computer system responsible for initiating the respective call to the third-party web service a second wait response message indicating that the corresponding service request message has been handled and including information associated with the response to the routed corresponding service request message relayed to the client computer system responsible for initiating the respective call to the third-party web service.

3. The system of claim 2, wherein the second wait request is received by the test manager system before the corresponding service request message is received by the test manager system.

4. The system of claim 2, wherein: the web server is a web server under direct test;

the corresponding service request message from the client computer system responsible for initiating the respective call to the third-party web service is routed to the third-party web server via the web server under direct test; and the response to the routed corresponding service request message is relayed to the client computer system responsible for initiating the respective call to the third-party web service via the web server under direct test.

5. The system of claim 2, wherein the test execution is managed by a test host system including at least a test framework, the test host system being configured to compare the response to the routed corresponding service request message relayed to the client computer system responsible for initiating the respective call to the third-party web service, with the information included in the second wait response message.

6. The system of claim 1, wherein service request messages are sent from browsers running on respective client computer systems.

7. The system of claim 6, wherein the test manager system is configured as a proxy accessible by the browsers of the client computer systems.

8. The system of claim 1, wherein each of the one or more client computer systems is identified at least in part by an IP address thereof.

9. The system of claim 1, wherein service request messages from a plurality of different client computer systems are routed to the web server via the test manager system, each of the client computer systems being identified by at least its respective IP address and header information included with a service request message that it has sent.

10. The system of claim 1, wherein the test execution includes at least one individual test operation that triggers multiple related service request messages to be sent to the test manager system.

11. The system of claim 1, wherein test operations in the test execution are suspended upon a first wait request being sent to the test manager system and pending return of a first wait response message.

12. The system of claim 1, wherein the test execution requires changes to neither the web server, nor the service running thereon.

13. The system of claim 1, wherein the service is a backend service, and wherein the test manager system is interposed between the one or more client computer systems and the web server.

14. A method of testing a web server and/or a network-provided computer service running on the web server in accordance with a test execution that includes a plurality of test operations, the method comprising at an intermediary computing device including processing resources including at least one processor and a memory:

routing service request messages from one or more client computer systems to the web server in accordance with the test execution;

maintaining, for each client computer system, a count of open service requests not yet responded to by the web server;

relaying return messages from the web server to the one or more client computer systems in accordance with the routed service request messages;

receiving a first wait request from a given client computer system; and in response to reception of the first wait request from the given client computer system: determining whether there are any open service requests for the given client computer system based at least in part on the count associated with the given client computer system, and determining whether a predefined period of time has elapsed;

in response to a determination that there are no open service requests for the given client computer system, returning to the given client computer system a first wait response message indicating that there are no open service requests for the given client computer system; and in response to a determination that the predefined period of time has elapsed, (a) interrupting each pending service request for the given client computer system, (b) resetting the counter for the given client computer system, and (c) returning to the given client computer system a first wait response message indicating that the predefined period of time has elapsed.

15. The method of claim 14, wherein at least one test operation in the test execution involves a call to a third-party web service hosted by a third-party web server, the method comprising for the at least one test operation in the test execution that involves the call to the third-party web service:

receiving a second wait request from the client computer system responsible for initiating the respective call to the third-party web service;

routing, to the third-party web server, a corresponding service request message from the client computer system responsible for initiating the respective call to the third-party web service;

relaying a response to the routed corresponding service request message to the client computer system responsible for initiating the respective call to the third-party web service;

determining whether the corresponding service request message has been handled; and in response to a determination that the corresponding service request message has been handled, returning to the client computer system responsible for initiating the respective call to the third-party web service a second wait response message indicating that the corresponding service request message has been handled and including information associated with the response to the routed corresponding service request message relayed to the client computer system responsible for initiating the respective call to the third-party web service.

16. The method of claim 15, wherein the second wait request is received by the intermediary computing device before the corresponding service request message is received by the intermediary computing device.

17. The method of claim 15, wherein the test execution is managed by a test framework, the test framework being configured to compare the response to the routed corresponding service request message relayed to the client computer system responsible for initiating the respective call to the third-party web service, with the information included in the second wait response message.

18. The method of claim 14, wherein service request messages are sent from browsers running on respective client computer systems.

19. The method of claim 18, wherein the intermediary computing device is configured as a proxy accessible by the browsers of the client computer systems.

20. The method of claim 14, wherein service request messages from a plurality of different client computer systems are routed to the web server via the intermediary computing device, each of the client computer systems being identified by at least its respective IP address and header information included with a service request message that it has sent.

21. The method of claim 14, wherein test operations in the test execution are suspended upon a first wait request being sent to the intermediary computing device and pending return of a first wait response message.

22. The method of claim 14, wherein the service is a backend service, and wherein the intermediary computing device is interposed between the one or more client computer systems and the web server.

23. A non-transitory computer readable storage medium tangibly storing a program for testing a web server and/or a network-provided computer service running on the web server in accordance with a test execution that includes a plurality of test operations, the program comprising instructions that, when executed by an intermediary computing device including processing resources including at least one processor and a memory, control the intermediary computing device to at least:

route service request messages from one or more client computer systems to the web server in accordance with the test execution;

maintain, for each client computer system, a count of open service requests not yet responded to by the web server;

relay return messages from the web server to the one or more client computer systems in accordance with the routed service request messages;

receive a first wait request from a given client computer system; and in response to reception of a first wait request from a given client computer system: determine whether there are any open service requests for the given client computer system based at least in part on the count associated with the given client computer system, and determine whether a predefined period of time has elapsed;

in response to a determination that there are no open service requests for the given client computer system, return to the given client computer system a first wait response message indicating that there are no open service requests for the given client computer system; and in response to a determination that the predefined period of time has elapsed, (a) interrupt each pending service request for the given client computer system, (b) reset the counter for the given client computer system, and (c) return to the given client computer system a first wait response message indicating that the predefined period of time has elapsed.

24. The non-transitory computer readable storage medium of claim 23, wherein at least one test operation in the test execution involves a call to a third-party web service hosted by a third-party web server, and further comprising instructions, when executed, respond to the at least one test operation in the test execution that involves the call to the third-party web service by at least:

receiving a second wait request from the client computer system responsible for initiating the respective call to the third-party web service;

routing, to the third-party web server, a corresponding service request message from the client computer system responsible for initiating the respective call to the third-party web service;

relaying a response to the routed corresponding service request message to the client computer system responsible for initiating the respective call to the third-party web service;

determining whether the corresponding service request message has been handled; and in response to a determination that the corresponding service request message has been handled, returning to the client computer system responsible for initiating the respective call to the third-party web service a second wait response message indicating that the corresponding service request message has been handled and including information associated with the response to the routed corresponding service request message relayed to the client computer system responsible for initiating the respective call to the third-party web service.

* * * * *